United States Patent
Hodgson et al.

(10) Patent No.: US 9,160,131 B2
(45) Date of Patent: *Oct. 13, 2015

(54) TRANSITION-METAL-DOPED THIN-DISK LASER

(71) Applicant: Coherent, Inc., Santa Clara, CA (US)

(72) Inventors: Norman Hodgson, Belmont, CA (US); Michael Hertwig, San Ramon, CA (US); H. Yang Pang, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,446

(22) Filed: Oct. 16, 2014

(65) Prior Publication Data

US 2015/0036706 A1 Feb. 5, 2015

Related U.S. Application Data

(63) Continuation of application No. 13/079,737, filed on Apr. 4, 2011, now Pat. No. 8,908,737.

(51) Int. Cl.
| | |
|---|---|
| *H01S 3/08* | (2006.01) |
| *H01S 3/04* | (2006.01) |
| *H01S 3/042* | (2006.01) |
| *H01S 3/06* | (2006.01) |
| *H01S 3/11* | (2006.01) |
| *H01S 3/02* | (2006.01) |
| *H01S 3/081* | (2006.01) |
| *H01S 3/094* | (2006.01) |

(Continued)

(52) U.S. Cl.
CPC . *H01S 3/04* (2013.01); *H01S 3/042* (2013.01); *H01S 3/0604* (2013.01); *H01S 3/094084* (2013.01); *H01S 3/11* (2013.01); *H01S 3/16* (2013.01); *H01S 3/025* (2013.01); *H01S 3/0405* (2013.01); *H01S 3/0407* (2013.01); *H01S 3/0621* (2013.01); *H01S 3/0623* (2013.01); *H01S 3/0816* (2013.01); *H01S 3/094038* (2013.01); *H01S 3/094076* (2013.01); *H01S 3/1625* (2013.01); *H01S 3/1636* (2013.01); *H01S 3/235* (2013.01)

(58) Field of Classification Search
CPC . H01S 3/042; H01S 3/0604; H01S 3/094084; H01S 3/025; H01S 3/0405; H01S 3/0621; H01S 3/0623; H01S 3/0816; H01S 3/094038; H01S 3/094076; H01S 3/1625; H01S 3/1636; H01S 3/235; H01S 3/0407
USPC .................................................... 372/70, 93
See application file for complete search history.

(56) References Cited

U.S. PATENT DOCUMENTS

| | | |
|---|---|---|
| 5,553,088 A | 9/1996 | Brauch et al. |
| 5,790,303 A | 8/1998 | Weston et al. |

(Continued)

OTHER PUBLICATIONS

International Search Report and Written Opinion received for PCT Patent Application No. PCT/US2012/31011, mailed on Jul. 2, 2012, 10 pages.

(Continued)

*Primary Examiner* — Yuanda Zhang
(74) *Attorney, Agent, or Firm* — Morrison & Foerster LLP (57) ABSTRACT

A laser includes a Ti:sapphire gain-medium in the form of a thin-disk. The thin-disk gain-medium is optically pumped by pump-radiation pulses having a wavelength in the green region of the electromagnetic spectrum. The pump-radiation pulses have a duration less than twice the excited-state lifetime of the gain-medium.

17 Claims, 6 Drawing Sheets

(51) Int. Cl.
  *H01S 3/16* (2006.01)
  *H01S 3/23* (2006.01)

(56) References Cited

U.S. PATENT DOCUMENTS

| | | |
|---|---|---|
| 6,577,666 B2 | 6/2003 | Erhard et al. |
| 6,765,947 B2 | 7/2004 | Kumkar |
| 6,778,580 B2 | 8/2004 | Erhard et al. |
| 7,003,005 B1 | 2/2006 | Lai et al. |
| 7,590,156 B1 | 9/2009 | Richardson et al. |
| 8,477,825 B2 | 7/2013 | Hertwig et al. |
| 8,508,844 B2 | 8/2013 | Hertwig et al. |
| 2005/0074041 A1* | 4/2005 | Sommerer et al. ............. 372/34 |
| 2007/0045597 A1 | 3/2007 | Alfano et al. |
| 2009/0201952 A1 | 8/2009 | Luo et al. |
| 2011/0013653 A1* | 1/2011 | Krausz et al. .............. 372/22 |
| 2011/0122483 A1* | 5/2011 | Lundquist et al. .......... 359/333 |

OTHER PUBLICATIONS

International Preliminary Report on Patentability received for PCT Patent Application No. PCT/US2012/031011, mailed on Oct. 17, 2013, 7 pages.

Havrilla et al., "Latest Advances in High Power Disk Lasers", Proceedings of SPIE, vol. 7578, 2010, pp. 75780C-1-75780C-11.

Killi et al., "The Broad Applicability of the Disk Laser principle—from CW to ps", Proceedings of SPIE, vol. 7193, 2009, pp. 7193T-1-7193T-9.

Kopf et al., "400-mW Continuous-Wave Diode-Pumped Cr:LiSAF Laser based on a Power-Scalable Concept", Optics Letters, vol. 20, No. 17, 1995, pp. 1782-1784.

Stolzenburg et al., "700 W Intracavity-Frequency Doubled Yb:YAG thin-disk Laser at 100 kHz Repetition Rate", Proceedings of SPIE, vol. 7578, 2010, pp. 75780A-1-75780A-9.

Sudmeyer et al., "High-Power Ultrafast thin Disk Laser Oscillators and their Potential for Sub-100-femtosecond Pulse Generation", Applied Physics B., vol. 97, 2009, pp. 281-295.

Schepler et al., "Thermal Effects in Cr2+:ZnSe Thin Disk Lasers", IEEE Journal of Selected Topics in Quantum Electronics, vol. 11, No. 3, May / Jun. 2005, pp. 713-720.

Yang et al., "Multipass Ti:Sapphire Amplifier Based on a Parabolic Mirror", Optics Communications, vol. 234, 2004, pp. 385-390.

Non Final Office Action received for U.S. Appl. No. 13/079,737, mailed on Mar. 14, 2013, 9 pages.

Final Office Action received for U.S. Appl. No. 13/079,737, mailed on Sep. 6, 2013, 9 pages.

Non Final Office Action received for U.S. Appl. No. 13/079,737, mailed on Jan. 6, 2014, 10 pages.

Notice of Allowance received for U.S. Appl. No. 13/079,737, mailed on Jun. 23, 2014, 8 pages.

* cited by examiner

TRANSITION-METAL-DOPED THIN-DISK LASER

PRIORITY

This application is a continuation of U.S. patent application Ser. No. 13/079,737, filed Apr. 4, 2011, the disclosure of which is incorporated herein by reference.

TECHNICAL FIELD OF THE INVENTION

The present invention relates in general to lasers and amplifiers having a transition-metal-doped gain-medium. The invention relates in particular to lasers in which the gain-medium is in the form of a thin-disk.

DISCUSSION OF BACKGROUND ART

Transition-metal-doped gain-media such as Ti:sapphire (Ti:$Al_2O_3$), Alexandrite (Cr:Be $Al_2O_3$), Cr:LISAF (Cr:LiSrAlF$_6$), Cr:LICAF (Cr:LiCaAlF$_6$), Forsterite (Cr:Mg-SiO$_4$) chromium-doped yttrium aluminum garnet (Cr:YAG) and chromium-doped zinc selenide (Cr:ZnSe) provide large wavelength tuning ranges of several hundred nanometers (nm) with relatively large cross-sections for stimulated emission. This enables ultrafast pulse generation with sub-picosecond (ps) pulse durations, down to less than ten femtoseconds (fs)

The most prominent of these transition-metal-doped gain-media is Ti:sapphire, which in the last two decades has found widespread use as a gain-medium in commercial ultrafast solid-state lasers. Titanium exhibits a broad tuning range of the emission wavelength between about 650 nm and about 1080 nm, and a relatively large emission cross-section of about $2.8 \times 10^{-19}$ cm$^2$ at the peak-emission wavelength. To date commercial Kerr lens mode-locked Ti:sapphire oscillators provide average output powers of up to 3 Watts (W) at a pulse-repetition frequency (PRF) of about 80 MHz, with typical pulse durations between about 10 and 150 fs. Pulse amplification in Ti:sapphire amplifiers enables pulse energies of up to 15 millijoules (mJ) per pulse at typical repetition rates of between about 1 and 5 kilohertz (kHz).

Figure 1:
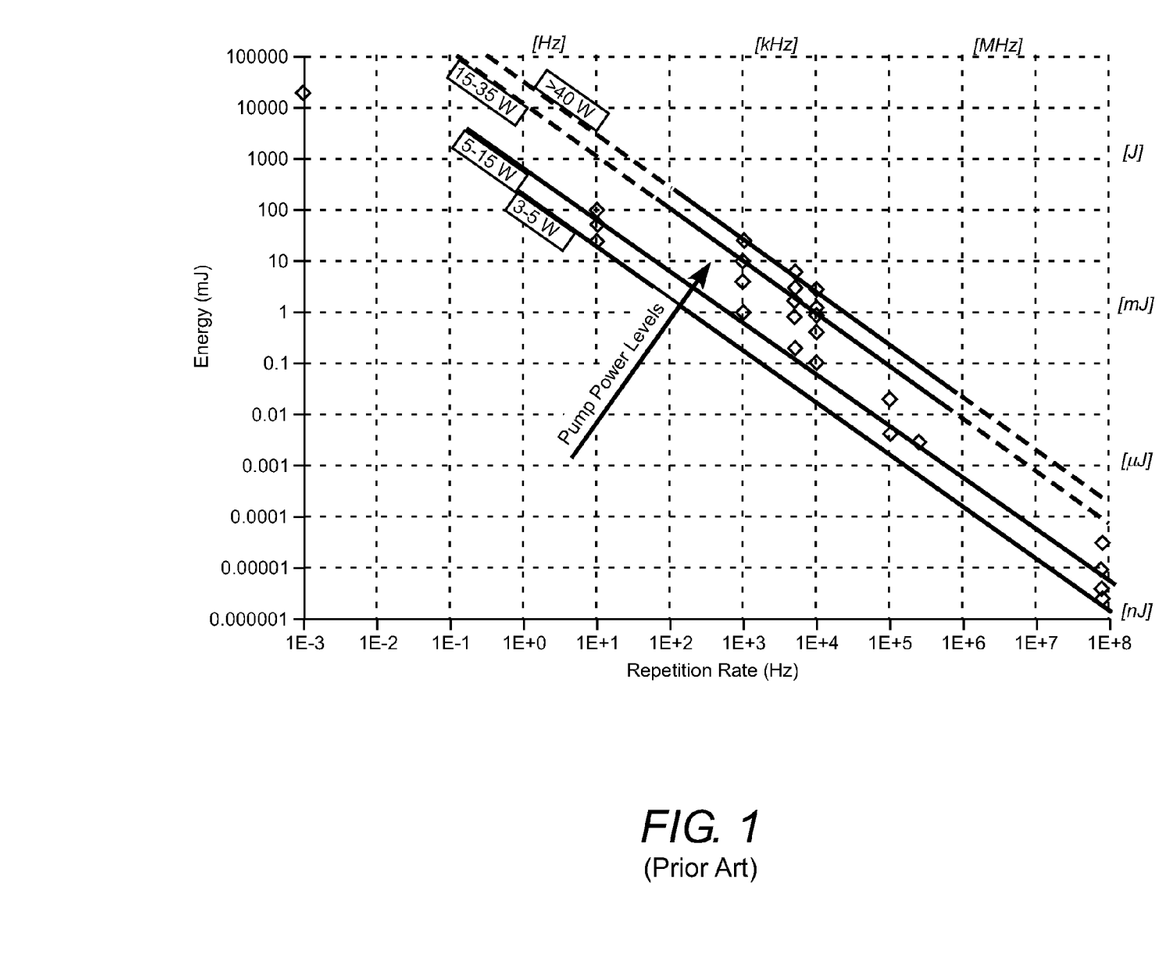
FIG. 1 is a graph schematically illustrating output pulse energy as a function of pulse repetition rate for prior-art modelocked Ti:sapphire oscillators and amplifiers for various ranges of average pump power in the green spectral region.

The gain-medium in all commercial Ti:sapphire lasers and amplifiers is in the form of a rod or slab that is end-pumped by continuous-wave (CW) green (frequency doubled) solid-state lasers with up to 18 W of pump power, or by Q-switched frequency-doubled Nd:YAG and Nd:YLF lasers emitting pulse energies of up to 50 mJ at 527 nm or 532 nm with pulse durations around 100 ns, PRF up to 10 kHz, and average output powers up to 100 W. FIG. 1 is a graph summarizing the performance of mode-locked Ti:sapphire oscillators and amplifiers for different pump power levels. The oscillator data is all at 80 MHz in the lower right of the graph.

Ti:sapphire has a large saturation intensity of 160 kilowatts per square centimeter (kW/cm$^2$). This is a result of the short excited-state lifetime of 3.2 microseconds (μs). Because of this, the pump-laser beam has to be focused very tightly to generate enough gain. In general, the product of pump-intensity times the ratio of pump-wavelength to laser-wavelength (this ratio typically is between 0.66 and 0.9) has to equal the saturation intensity of the gain-medium to achieve a small-signal gain $g_0l$ of 1.0.

For many transition-metal-doped gain-media, the pump-intensity has to be greater than 100 kW/cm$^2$ in order to have high enough small-signal gain. In mode-locked Ti:sapphire oscillators, for example, the pump-spot diameter is typically less than 50 micrometers (mm) to achieve a pump-intensity of 200 kW/cm$^2$. This results in strong thermal lensing (up to 200 Diopters) in the gain-medium, and limited power-scaling capability in TEM$_{00}$ mode operation due to pump-induced thermal aberration. In Ti:sapphire amplifiers, the use of Q-switched green pump-lasers with relatively high pulse energies and pulse intensities allows the increase of the pump-spot diameter to about 1 mm. However, due to a relatively large quantum defect of Ti:sapphire (about 35%) heat generation also limits the power scaling of Ti:sapphire amplifiers.

At present, the maximum average power than can be extracted from a standard Ti:sapphire amplifier is around 15 W. The current technique to further power scale Ti:sapphire amplifiers is to use several amplifiers in series or to apply cryogenic cooling to the Ti:sapphire gain-medium. With liquid-nitrogen cooling, the thermal conductivity can be increased by one order of magnitude and the temperature derivative of the refractive index (dn/dT) is decreased by almost one order of magnitude, resulting in a 50-times decrease of the thermal lensing and a similar decrease of thermal aberration. Cryogenically cooled Ti:sapphire amplifiers have generated up to 25 mJ of pulse energy at 1 kHz, but the cooling equipment adds considerable cost and footprint to the laser system.

There is a need for a more effective Ti:sapphire amplifier architecture that allows improved power scaling without the need for incorporating non-standard cooling techniques. Very similar power-scaling limitations exist for other transition-metal-doped gain-media that have high saturation intensities, such as Cr:BeAl$_2$O$_3$, Cr:LISAF, or Cr:Forsterite, or exhibit poor thermal-lensing properties, like Cr:ZnSe.

It is well know that a thin-disk geometry for a gain-medium provides excellent thermal management due to a small thickness of the disk (of around 150 microns) and a large cooling area in contact with a heat-sink. Thermal management can be further increased by using heat-spreader material, for example, diamond, between the disk and the heat-sink. For high power Yb:YAG thin-disk lasers having a saturation intensity of about 10 kW/cm$^2$, with typical disk thicknesses of between about 100 and 200 μm and pump-spot diameters between 4 and 10 mm, output powers of greater than 5 kW per disk have been demonstrated for pump intensities of up to 20 kW/cm$^2$ and heat generation in the disk of up to 2 kW/cm$^2$. However, the scientific literature clearly states that the thin-disk concept is not well suited for Ti:sapphire gain material or Chromium doped LISAF, because of the above-discussed high saturation intensity in combination with a large quantum defect and poor thermal properties (in case of LISAF).

This statement is certainly true if a pump-laser in CW operation is used. For Ti:sapphire, and an absorbed CW pump-power of 50 W at 532 nm, the pump-spot diameter has to be less than 500 μm in order to generate to generate sufficient small-signal gain ($g_0l=0.2$) with each incidence of a pump-beam on the disk. The generated heat per cooling area of about 8 kW/cm$^2$ is a factor of four to five times higher than what is thermally manageable for current thin-disk technology. In addition, a low aspect ratio (pump-spot diameter to thickness) results in temperature gradients perpendicular to the beam propagation direction which further limits the ability to generate a high power TEM$_{00}$ mode beam.

In order to provide a power scalable Ti:sapphire oscillator and amplifier concept, it will be necessary to overcome the thermal limitations of the current gain-geometries and find design criteria for a thin-disk Ti:sapphire gain-medium that offer improved thermal management without decreasing the gain in the gain-medium. These thin-disk design criteria should also be applicable to other transition-metal-doped gain-media discussed above. All of these gain-media have high saturation intensities, and most have high quantum defects and poor thermal properties which, without proper pumping and cooling designs, make them unsuitable for a thin-disk gain-medium approach.

SUMMARY OF THE INVENTION

In one aspect optical apparatus in accordance with the present invention comprises a transition-metal-doped gain-medium in the form of a thin-disk having first and second opposite surfaces and having a characteristic excited-state lifetime. The thin-disk gain-medium is supported with the first surface thereof in thermal communication with a heat-sink. A first mirror is located between the first surface of the gain-medium and the heat-sink. The first mirror is one of a plurality thereof forming an optical resonator including the gain-medium. A pump-laser is arranged to deliver repeated pulses of pump-radiation having a wavelength absorbed by the transition-metal-doped gain-medium. The pulses have a duration less than about twice the excited-state lifetime of the thin-disk gain-medium. A multi-pass optical arrangement is provided for causing each of the pump-radiation pulses to make a plurality of incidences on the second surface of the gain-medium with a fraction of the energy in the pump-radiation pulse being absorbed by the gain-medium on each incidence.

In one example of the inventive apparatus the optical resonator is a laser resonator terminated by the first mirror and another of the plurality of mirrors. The transition-metal-doped gain-medium is Ti:sapphire having a doping concentration of about 0.7% by weight and twelve incidences of a pump-radiation pulse on the thin-disk cause 95% of the power in the pulse to be absorbed in the thin-disk. The excited-state lifetime of the Ti:sapphire is 3.2 μs and the pulse duration is about 100 ns. The energy per pulse is 40 mJ. The pump-spot diameter on the thin-disk is 3.1 mm. Calculations indicate that with a PRF sufficiently high that 300 Watts of pump power is absorbed the average output power will be about 100 Watts.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 2:
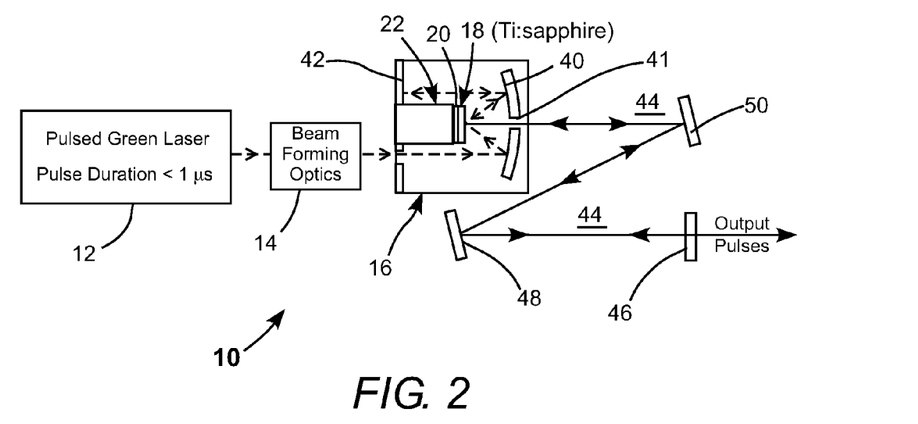
FIG. 2 schematically illustrates a preferred embodiment of a pulsed Ti-sapphire thin-disk laser in accordance with the present invention including a pulsed green pump laser delivering a beam of pulses having a duration less than the excited-state lifetime of Ti:sapphire, beam forming optics for shaping the beam from the green laser into a desired cross-section, a gain module including a reflector-backed Ti:sapphire thin-disk gain-medium on a cooling arrangement and an arrangement for multi-pass pumping the thin disk with the green-laser beam, and a laser-resonator formed between the backing reflector and an output coupling mirror and including the Ti:sapphire gain-medium.

Referring now to the drawings, wherein like components are designated by like reference numerals, FIG. 2 schematically illustrates a preferred embodiment 10 of laser apparatus in accordance with the present invention. Apparatus 10 includes gain module 16 including a Ti:sapphire gain-medium 18 in the form of a thin-disk. The disk has a ratio of disk diameter to disk width of at least about five, and preferably greater than about twenty. The disk is supported in thermal communication with a heat-sink 22. There is a reflector 20 between the disk and the heat-sink. Preferably, the reflector is coated on the surface of the disk facing the heat-sink.

A pulsed green laser 12 delivers repeated pulses of radiation having a duration about equal to or less than twice the excited-state lifetime of the Ti:sapphire gain-medium, which, as noted above, is about 3.2 μs. The pulse beam is depicted by a dashed line, with open arrowheads depicting propagation direction. Preferably, the pulse duration is very much less than the excited-state lifetime, a duration of less than 1.0 μs is preferred. In one contemplated example, the pulse duration is 100 ns, pulses have a pulse energy of 40 mJ, and the PRF is between about 1 and 100 kHz. A laser suitable for use as laser 12 is a frequency doubled, Q-switched, NdYLF laser model Evolution-HE, available from Coherent Inc. of Santa Clara, Calif.

A beam forming arrangement 14 is provided for shaping or expanding the beam to a predetermined diameter which will eventually define the pump-spot size on disk 18. As such beam forming arrangements are well-known in the art, a detailed description thereof is not presented herein. The formed beam enters the gain module and is incident on a concave (preferably parabolic) mirror 40 which images the beam onto disk 18 through the surface thereof opposite the backing reflector. The reflector is highly reflecting for the wavelength of the pulses from laser 12. A portion of the beam is reflected from reflector 20 back onto mirror 40, which reflects the beam onto a plane mirror 42. Mirror 42 reflects the beam back along the incident path to mirror 40 and back to disk 18 where a further proportion of the beam is absorbed.

The multiple incidence (multi-pass in and out of the gain-medium) arrangement is simplified to the two pass arrangement of FIG. 2 for convenience of illustration, given the scale of the drawing. It is a 1:1 imaging arrangement such that the pump-spot size is the same at each incidence. An arrangement that can provide more than two incidences (double-passes) is preferred and such an arrangement is described further hereinbelow.

A laser resonator (oscillator) 44 is formed by reflector 20 and a mirror 46 which is partially reflective and partially transmissive for wavelengths in the gain-bandwidth of the gain-medium. The resonator is twice-folded by mirrors 48 and 50. Gain-medium 18 is energized by absorbed pulses, causing laser radiation (pulses) to circulate in the resonator, via an aperture 41 in mirror 40, and be delivered from the resonator as output pulses via partially transmissive mirror 46. The output pulses have about the same duration and the same PRF as the pump-pulses.

Figure 3:
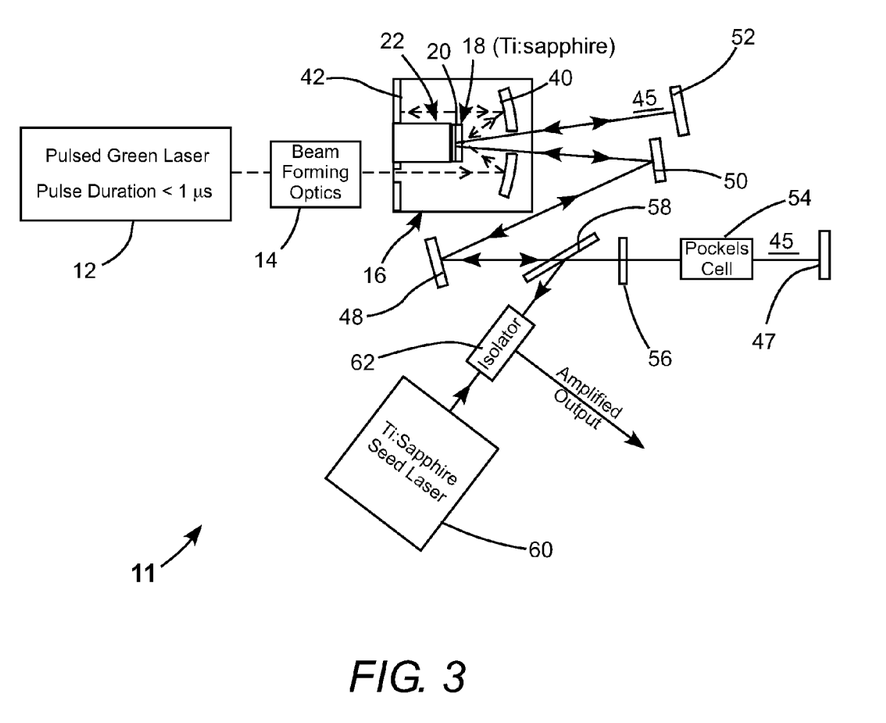
FIG. 3 schematically illustrates a preferred embodiment of a Ti:sapphire thin-disk regenerative amplifier in accordance with the present invention similar to the laser of FIG. 2 but wherein the laser resonator is replaced by a regenerative amplifier, a polarizer, Pockels-cell, and quarter-wave plate combination for switching seed pulses in and out of the regenerative amplifier resonator, and wherein a modelocked Ti:sapphire laser provides the seed pulses for amplification.

FIG. 3 schematically illustrates a preferred embodiment 11 of a regenerative amplifier apparatus in accordance with the present invention. This apparatus is similar to apparatus 10 of FIG. 2 with exceptions as follows. Resonator 44 of apparatus 10 is replaced in apparatus 11 by a resonator 45 formed between mirrors 47 and 52, which are highly reflective for wavelengths in the gain-bandwidth of gain-medium 18. The resonator is thrice-folded by mirrors 48 and 50 and reflector 20. Located in resonator 45 are a Pockels-cell 54, a quarter-wave plate 56 and a thin-film polarizer 58, which, together, form the well-known arrangement for switching seed-pulses into and out of a regenerative-amplifier resonator for amplification.

Seed pulses to be admitted to the resonator are provided by a mode-locked Ti:sapphire laser 60. Ti:sapphire lasers offered by Coherent Inc. of Santa Clara Calif. under the model names Micra or Mantis are suitable for the seed-pulse laser. Amplified pulses switched out of the resonator are directed away from the input path by an isolator 62, as is known in the art. In this embodiment of the present invention, the amplified pulses will have about the same duration as the seed-pulses from laser 60, for example, between about 100 ns and 200 ns.

While an optical amplifier in accordance with the present invention is described with reference to a regenerative amplifier including an optical resonator, those skilled in the art will recognize without further detailed that the invention is applicable to other forms of amplifier. By way of example the amplifier could be a multi-pass amplifier wherein an optical arrangement is configured to cause a pulse to be amplified to make a predetermined finite number of incidences on the transition-metal doped thin disk.

Figure 4:
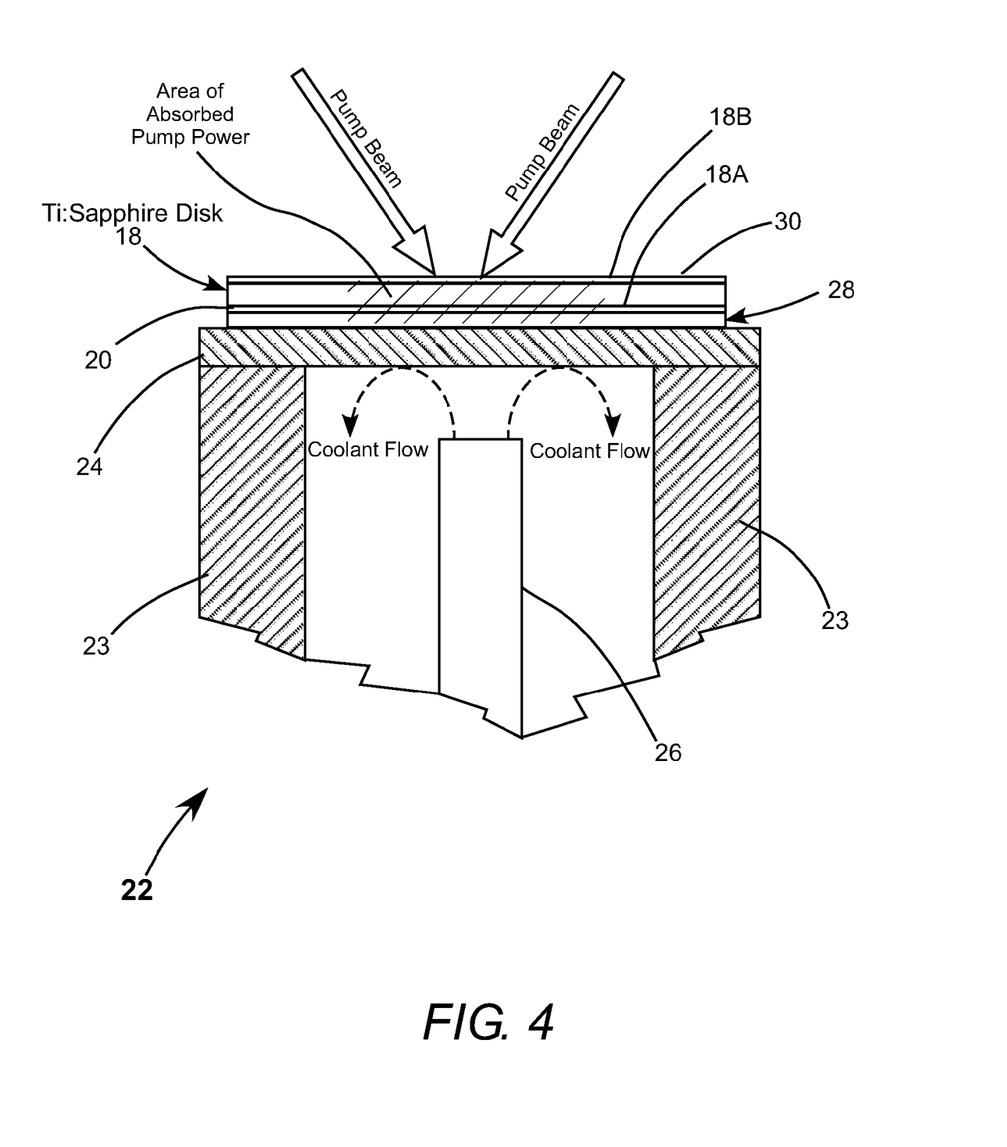
FIG. 4 is a fragmentary view, partially in cross-section illustrating details of a preferred example of the Ti:sapphire thin-disk cooling arrangement for the laser of FIG. 2 and the amplifier of FIG. 3.

FIG. 4 is a fragmentary view, partially in cross-section, schematically illustrating details of a preferred example of the Ti:sapphire thin-disk cooling arrangement for the laser of FIG. 2 and the amplifier of FIG. 3. Here, cooling arrangement 22 includes a cylindrical body 23 having a heat-sink cap 24. Preferred materials for the heat-sink cap are copper (Cu) and copper tungsten (CuW). Reflector 20 is deposited on surface 18A of disk 18 and is preferably a multilayer dielectric reflector, or a reflector formed from silver and dielectric layers. The heat-sink is cooled by impingement cooling, with coolant delivered by a centrally placed tube 26 and thus caused to flow from the center of the heat-sink outward as schematically depicted.

Figure 5:
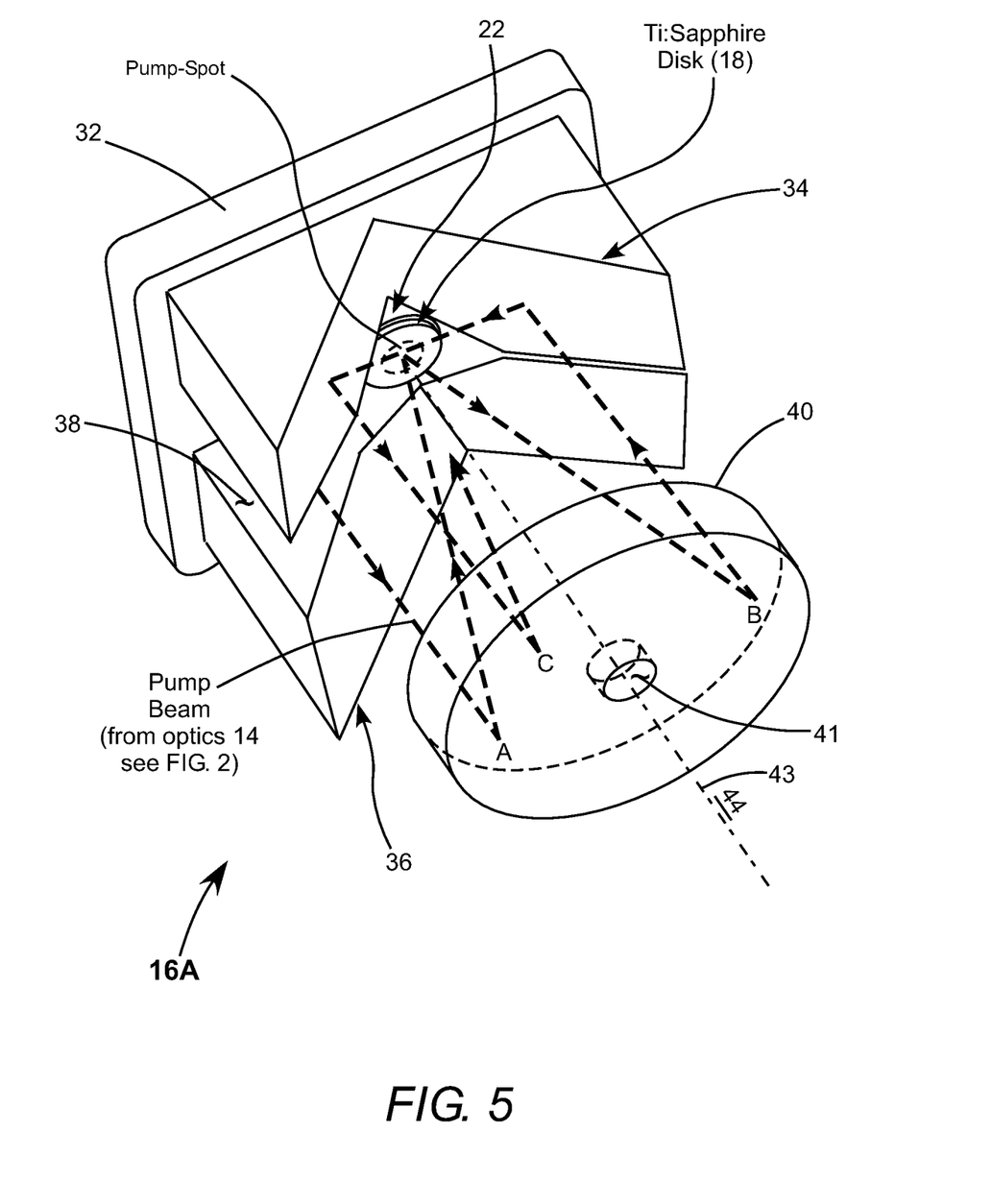
FIG. 5 is a three-dimensional view schematically illustrating a preferred example of a multi-pass pumping arrangement for the laser of FIG. 2 and the amplifier of FIG. 3.

Optionally a heat spreader 28 such as a chemical vapor deposited (CVD) diamond wafer is placed between the disk and the heat-sink. The shaded area of disk 18 indicates the area of absorbed pump-power, which corresponds approximately to the area of the pump beam on disk 18. An antireflection coating 30 is preferably deposited on disk 18. The disk, heat-spreader and heat-sink are preferably bonded together by solder, such as gold-tin (AuSn) silver-tin (AgSn) or indium (In) for optimizing thermal communication between the disk and the heat-sink FIG. 5 is a three-dimensional view schematically depicting a multi-pass pump arrangement 16A suitable for providing more than the two incidences of the pump-beam on thin-disk 18 provided by the simple arrangement 16 of FIG. 2 and FIG. 3. In arrangement 16A, two inside 45-degree retro-reflecting 34 and 36 are mounted on a base 32. The prisms are cooperative with a concave (preferably parabolic) mirror 40. On one side of the apexes of the prisms, the prisms are cut away in a region 38 such that the pump-beam from optics 14, having been directed through an aperture (not shown) in the base, can impact mirror 40 at a point A thereon above or below (here below) the optical axis of the mirror. Disk 18 on heat-sink arrangement 22 is located at the focus of mirror 40 on the optic axis of the mirror which corresponds to the longitudinal axis 43 of resonator 44. An aperture 41 in mirror 40 provides access to thin-disk 18 for circulating laser radiation. Additional information about multi-pass optics can be found in copending application, Ser. No. 12/821,026, filed Jun. 22, 2010, incorporated herein by reference.

The pump-beam is imaged onto disk 18 by mirror 40 into a pump-spot (indicated by a dashed line) of a predetermined diameter. A portion of the pump-radiation is absorbed by a forward and reverse pass through the disk and is directed back onto mirror 40 at a point B thereon above the optical axis of the mirror. The pump-beam is then directed to prism 34 and is retro-reflected back onto mirror 40 at a point C thereon above the optical axis to be focused back onto the disk. The focusing and retro-reflecting proceeds accordingly. The number of incidences of the beam on the disk is determined by the initial point of impact of the pump-beam on the mirror, and the relative spacing of the prisms. This is a 1:1 imaging system, such that the pump-spot is the same diameter on each incidence of the beam on the disk.

The arrangement of FIG. 5 is one of several multi-pass pumping arrangements known in the art that have been developed for pumping conventional ytterbium-doped thin-disk gain-media. Any of these arrangements may be used to pump Ti:sapphire doped thin-disk 18 without departing from the spirit and scope of the present invention.

While certain prior-art optical arrangements and gain-geometries are incorporated in the inventive laser and amplifier it was necessary to overcome the thermal limitations of these gain-geometries and find design criteria that offer improved thermal management without decreasing the gain in the Ti:sapphire and other transition-metal-doped gain-media. As noted above, all of these transition-metal-doped gain-media have high saturation intensities, and most have high quantum defects and poor thermal properties which, without proper pumping and cooling designs, make them unsuitable for a thin-disk gain-medium approach. Set forth below is a description of how suitable criteria were determined.

Ti:sapphire can be doped at a concentration of up to 1 weight percent, which corresponds to a titanium ion density of $5 \times 10^{20}$ ions/cm$^3$. This doping level is one order of magnitude lower than is usual in conventional ytterbium-doped thin-disk gain-media. High pump-radiation absorption requires the existence of a sufficient number of doping ions within the pump-spot diameter. It was determined that for the relatively weakly doped Ti:sapphire disk, this can be accomplished by increasing the pump-spot diameter to several millimeters.

Figure 6:
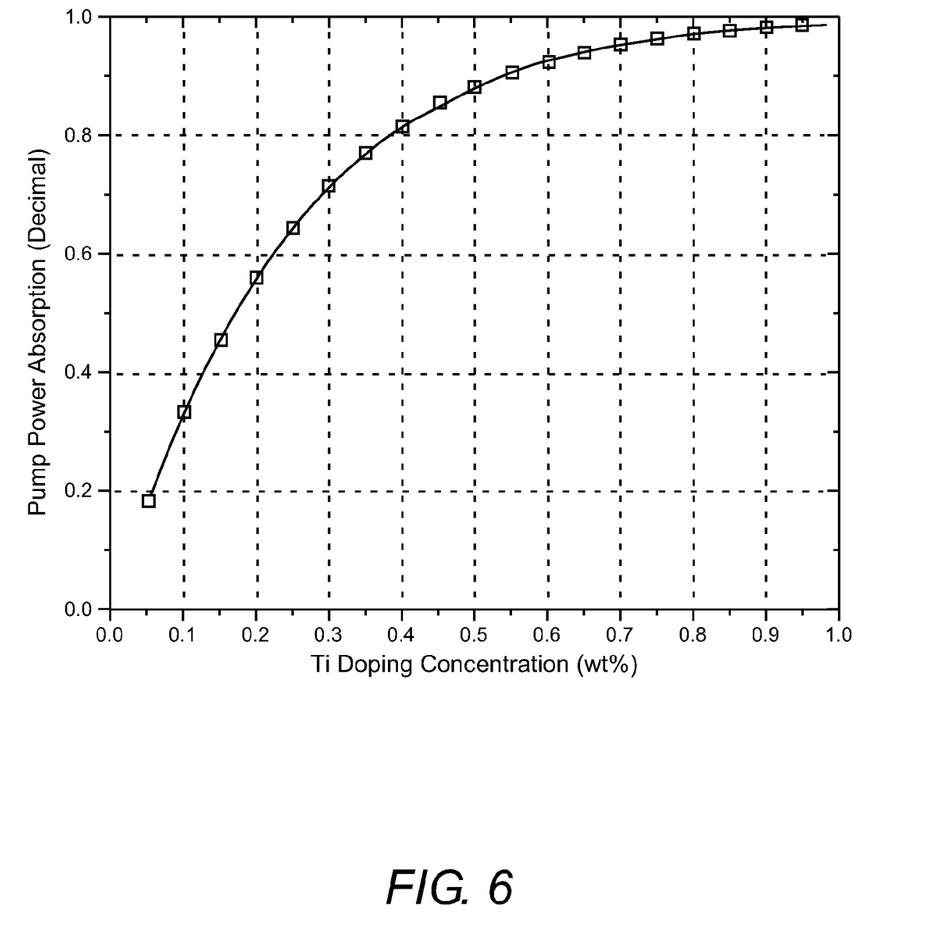
FIG. 6 is a graph schematically illustrating pump power absorption as a function of Ti-doping concentration in an example of the multi-pass pump arrangement of FIG. 5, for pump-radiation having a wavelength of 532 nm, a Ti-sapphire disk having a thickness of 140-micrometer and a diameter of 10 mm, a pump beam diameter of 3.1 mm, a pump pulse energy of 40 mJ, and a pump pulse repetition rate of 10 kHz, with the pump beam making twelve passes through the Ti:sapphire disk.

FIG. 6 is a graph schematically illustrating calculated pump-radiation absorption of a 140 μm-thick Ti:sapphire disk as a function of doping concentration. It is assumed that the disk is in a pumping arrangement similar or comparable to that of FIG. 5 arranged to provide 12 incidences of the beam with a pump-spot diameter of 3.1 mm. The pump laser is a pulsed 532 nm laser with a pulse-energy of 40 mJ and a pulse duration of 100 ns. For doping concentration of greater 0.65 wt %, more than 95% of the pump energy is absorbed by the thin disk. In order to attain high enough small-signal gain ($g_0l$) for a double pass through the disk for this relatively large pump-spot diameter, pulsed pumping is required. Preferably, pumping is such that $g_0l$ is greater than about 0.2, and more preferably greater than about 1.0.

Assuming a rectangular pump-pulse with pulse duration Δt (with Δt being at shorter than about two times the upper state lifetime than the gain-medium) and pulse energy E, a pumped area A on the disk, and a pump photon energy $hv_p$, the double-pass small-signal gain can be well approximated by an equation:

$$g_0l = 2E\sigma/(hv_p A), \quad (1)$$

where σ is the cross-section for stimulated emission (equal to $2.8 \times 10^{-19}$ cm$^2$ for Ti:sapphire). Inserting a boundary condition $g_0 > 0.2$ into equation (1), the minimum absorbed pump-energy fluence in J/cm$^2$ is obtained by:

$$E/A > 0.1 hv_p/\sigma \quad (2)$$

For a Ti:sapphire gain-medium and pumping at a wavelength of 532 nm, the minimum absorbed pump-energy fluence derived from equation (2) is about 0.13 J/cm$^2$. In a pumping arrangement such as that of FIG. 5 providing twelve incidences (double passes in and out of the disk), a 0.7 wt % doped thin disk will exhibit 95% absorption of the incident pump-pulse energy of 40 mJ. The resulting absorbed pump-energy fluence is 0.5 J/cm$^2$ and the double-pass small-signal gain is $g_0l = 0.77$.

In order to achieve efficient laser operation in the laser of FIG. 2 or the regenerative amplifier of FIG. 3, it is important to limit the maximum temperature inside the thin-disk in addition to increasing the small-signal gain as much as possible. Thermally induced population of a lower laser level and the temperature dependence of the cross-section considerably limit the optical efficiency if the gain-medium becomes too hot. As a rule of thumb, the maximum temperature inside the disk should be kept below 200° C., or the temperature rise should be below 175° C. For the thin disk geometry, the maximum temperature rise scales inversely with the pump-spot diameter d, and proportionally to the dissipated heat. The temperature rise can be approximated by an equation:

$$T_{ax} = Q^* E/A^* f^* d/(2K_{HS})^*[1 + K_{HS}/K_{GM}^* t/d] \quad (3)$$

where $\eta_q$ is the quantum defect (about 0.34 for Ti:sapphire), f is PRF of the pulsed pump laser, E/A is the absorbed pump-energy fluence, $K_{HS}$ and $K_{GM}$ are the thermal conductivity of heat-sink material and gain material, respectively. By combining equations 1 and 3, a relationship between double-pass gain $g_0l$ and the maximum temperature rise is obtained:

$$T_{ax} = Q^* g_0^* hi_p/\sigma^* f^* d/(4K_{HS})^*[1 + K_{HS}/K_{GM}^* t/d] \quad (4)$$

Equations 2-4 are used to minimize the temperature rise (to below 175° K) for a given thin-disk gain-medium and required small-signal gain, by minimizing the disk diameter and aspect ratio t/d at constant energy fluence and optimizing the cooling efficiency.

Figure 7:
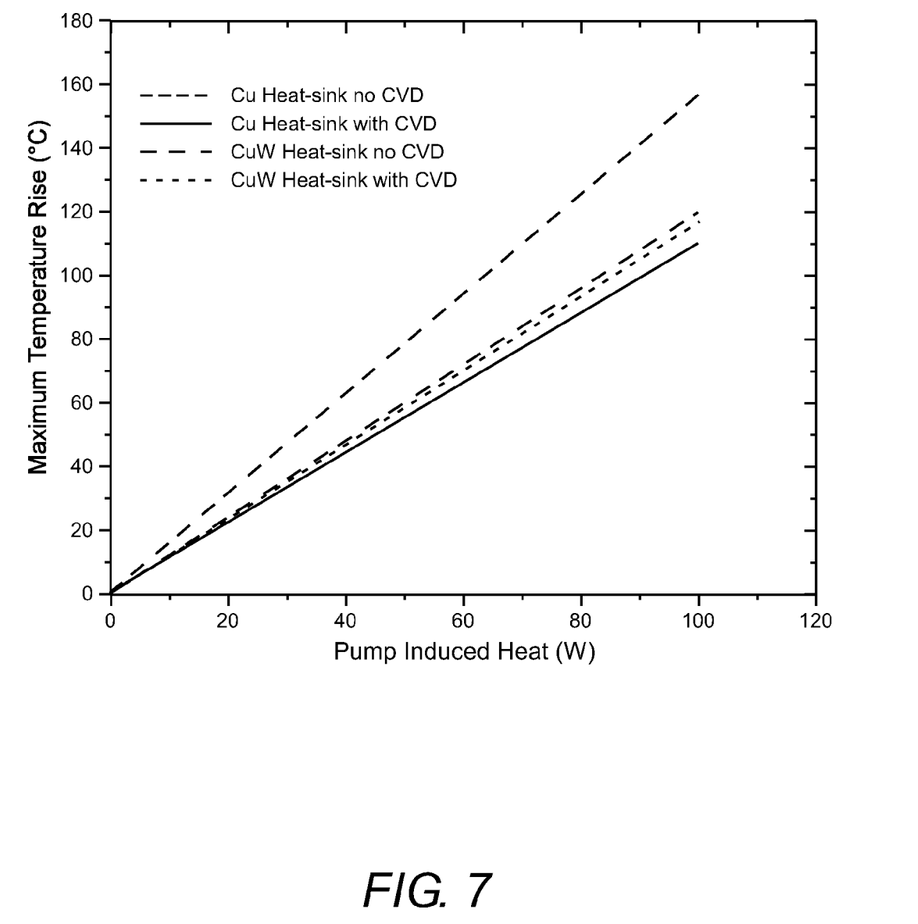
FIG. 7 is a graph schematically illustrating calculated maximum temperature of the Ti:sapphire disk of FIG. 6 as a function of the heat deposited by the pump-radiation for various configurations of the cooling arrangement of FIG. 4.

FIG. 7 is a graph schematically illustrating calculated maximum temperature rise as a function of the dissipated heat in a 140 micrometer thick Ti:sapphire disk with a pump-spot diameter of 3.1 mm for different heat-sink materials, with and without a CVD heat spreader between the Ti:sapphire disk and the heat-sink. The lowest temperature rise of 110 degree Kelvin at 100 W of heat is obtained with a copper heat-sink and a diamond heat spreader. This example clearly indicates that it is possible to achieve high gain, high average pump-power and output power and low temperature in Ti:sapphire thin-disk gain-media. For the assumed pump-spot diameter of 3.1 mm, an absorbed pump energy of 30 mJ at 10 kHz generates a double-pass small-signal gain of $g_0l = 0.56$, a maximum temperature rise of 110 degree K, and with 300 W of absorbed average pump power, an average output power of about 100 W can be expected if the thin-disk gain-medium is used in a laser oscillator.

Summarizing criteria for successful operation of a transition-metal-doped thin-disk oscillator or amplifier in accordance with the present invention, most important is that the duration of the pump-radiation pulses must be less than twice the excited-state lifetime of the transition-metal-doped gain-medium. Preferably the transition-metal dopant concentration is greater than about 0.2% by weight; the pump-spot diameter on the thin disk is greater than about 1.0 mm; and the energy-per-pulse of pump-radiation pulses is greater than about 5.0 mJ. Preferably sufficient incidences of a pump-radiation pulse on the thin-disk gain-medium are provided that more than about 80% of the pump-radiation is absorbed by the gain-medium.

While the criteria for successful operation of a transition-metal-doped thin-disk laser or amplifier are derived above with reference to a Ti:sapphire thin-disk gain-medium, the criteria are applicable to other transition-metal-doped gain-media including Ti:sapphire, Alexandrite, Forsterite, Cr:L-ISAF, Cr:LICAF, Cr:YAG, and Cr:ZnSe. Ti:sapphire and Alexandrite can be conveniently pumped with short-pulsed pump-radiation in the green region of the electromagnetic spectrum between about 480 nm and about 560 nm. Pulsed radiation having a wavelength of 532 nm can be supplied, as noted above, by commercially available frequency-doubled (second-harmonic generating) lasers with bulk solid state gain-media such as Nd:YAG, Nd:YLF or Nd:YVO$_4$. Ti:sapphire and Alexandrite can also be pumped by pulsed frequency-doubled Yb:YAG lasers which provide green output power at around 515 nm. Other transition-metal-doped gain-media may require longer or shorter pulse-radiation wavelengths. These can be supplied, albeit less conveniently, by other frequency conversion techniques such as sum-frequency mixing, difference-frequency mixing, optical parametric generation (frequency division), or harmonic-generation in combination with optical parametric generation. Pr:YLF is an example of a rare-earth doped solid-state gain-medium that has several emission lines in the visible and NIR region of the electromagnetic spectrum. Longer wavelength pulsed radiation can be generated with Tm:YAG or Tm:YALO which provide laser emission wavelengths between 1.8 and 2.0 μm, or Er:YAG emitting around 1.6 μm. This wavelength range overlaps with the absorption spectrum of the transition-metal-doped gain-medium Cr:ZnSe.

The present invention is described above with reference to a preferred and other embodiments. The invention is not limited, however, to the embodiments described and depicted. Rather, the invention is limited only by the claims appended hereto.

What is claimed is:

1. An optical apparatus, comprising:
   an optical resonator;
   a Ti:sapphire gain medium located within the optical resonator, the gain-medium having an excited-state lifetime of about 3.2 microseconds, the gain medium being in the form of a thin-disk having a ratio of disk diameter to disk thickness of at least five;
   a heat sink in thermal communication with the gain medium;
   a pump-laser arranged to deliver repeated pulses of radiation having a wavelength absorbed by the gain medium, wherein the pulses have a duration less than 1.0 microsecond; and
   a multi-pass optical arrangement for causing each of the pump laser pulses to make a plurality of incidences on the gain-medium with a fraction of the energy in the pulse being absorbed by the gain-medium on each incidence.

2. The apparatus of claim 1, wherein the pump pulses have an energy-per-pulse greater than about 5 millijoules.

3. The apparatus of claim 2, wherein the pump pulses are delivered at a pulse-repetition frequency between about 1 and 100 kilohertz.

4. The apparatus of claim 3, wherein the optical resonator is a laser resonator, the pump-laser pulses energize the gain-medium causing laser radiation having a fundamental wavelength characteristic of the gain medium to circulate in the laser resonator, and the optical resonator is arranged to deliver the fundamental radiation as output radiation.

5. The apparatus of claim 3, wherein the optical resonator is a resonator of a regenerative amplifier and includes an optical-switch arrangement for switching seed-pulses from a seed-pulse laser into the resonator to be amplified by the gain medium, and switching amplified pulses out of the resonator as output pulses.

6. The apparatus of claim 3, wherein the pump-laser pulses have a wavelength of about 532 nm.

7. The apparatus of claim 3, wherein the ratio of disk diameter to disk thickness is greater than twenty.

8. The apparatus of claim 3, further including beam-forming optics between the pump-laser and the multi-pass optical arrangement, and wherein the multi-pass optical arrangement is arranged cooperative with the beam-forming optics such that the pump-laser pulses are incident on the surface of the gain-medium in a pump-spot having a diameter greater than about 1 millimeter.

9. The apparatus of claim 1, wherein the ratio of disk diameter to disk thickness is greater than twenty.

10. An optical apparatus, comprising:
    a Ti:sapphire gain medium having an excited-state lifetime of about 3.2 microseconds, the gain medium being in the form of a thin-disk having a ratio of disk diameter to disk thickness of at least five;
    a heat sink in thermal communication with the gain medium;
    a pump-laser arranged to deliver repeated pulses of radiation having a wavelength absorbed by the gain medium, wherein the pulses have a duration less than 1.0 microsecond;
    a multi-pass optical arrangement for causing each of the pump laser pulses to make a plurality of incidences on the gain-medium with a fraction of the energy in the pulse being absorbed by the gain-medium on each incidence; and
    a seed laser for generating seed pulses to be amplified, said seed pulses being directed to the gain medium to be amplified thereby.

11. The apparatus of claim 10, wherein the pump pulses have an energy-per-pulse greater than about 5 millijoules.

12. The apparatus of claim 11, wherein the pump pulses are delivered at a pulse-repetition frequency between about 1 and 100 kilohertz.

13. The apparatus of claim 12, further including an optical resonator, said gain medium being located within the optical resonator, and wherein the amplifier is a regenerative amplifier and includes an optical-switch arrangement for switching seed pulses from the seed laser into the resonator to be amplified by the gain medium, and switching amplified pulses out of the resonator as output pulses.

14. The apparatus of claim 12, wherein the pump-laser pulses have a wavelength of about 532 nm.

15. The apparatus of claim 12, wherein the ratio of disk diameter to disk thickness is greater than twenty.

16. The apparatus of claim 12, further including beam-forming optics between the pump-laser and the multi-pass optical arrangement, and wherein the multi-pass optical arrangement is arranged cooperative with the beam-forming optics such that the pump-laser pulses are incident on the surface of the gain-medium in a pump-spot having a diameter greater than about 1 millimeter.

17. The apparatus of claim 10, wherein the ratio of disk diameter to disk thickness is greater than twenty.

* * * * *